Patented Nov. 16, 1926.

1,607,331

UNITED STATES PATENT OFFICE.

THEODORE WHITTELSEY, OF RINGOES, NEW JERSEY, AND CHARLES E. BRADLEY, OF MISHAWAKA, INDIANA, ASSIGNORS TO THE NAUGATUCK CHEMICAL COMPANY, OF NAUGATUCK, CONNECTICUT, A CORPORATION OF CONNECTICUT.

PROCESS FOR TREATING RUBBER AND SIMILAR MATERIALS AND PRODUCTS OBTAINED THEREBY.

No Drawing. Original application filed February 19, 1920. Serial No. 359,818. Divided and this application filed September 24, 1925. Serial No. 58,426.

This invention relates to processes for treating rubber and similar materials and to the products obtained thereby, and it is more particularly related to the process of vulcanizing rubber by a sulphur compound. A probable explanation of the use of various accelerators in the vulcanization of rubber is that they react with the sulphur ordinarily employed to provide nascent sulphur or an extremely active type of sulphur which in turn must react with the rubber to provide vulcanization. There is thus introduced in the vulcanization process an extra time element consumed in the reaction between the accelerator and the vulcanizing agent and the reaction between the product of this union with the rubber. In addition certain accelerators such as lead oxide lend their coloration to the stock, others impart an undesirable odor to the vulcanized rubber, and in general the better accelerators introduce considerable added expense in the vulcanizing process.

One of the objects of the present invention accordingly is to provide a vulcanizing agent and a process for vulcanizing agent and a process for vulcanization which shall improve the speed of vulcanization. Another object of the invention is to provide a simple vulcanizing process in which the vulcanizing agent shall provide a vulcanized product free from objectionable color, odor, etc. Another object of the invention is to provide a series of vulcanized products substantially free from bloom and having improved ageing properties.

The invention accordingly consists in subjecting rubber and similar material to treatment with a vulcanizing agent adapted to transfer sulphur from itself to the rubber under vulcanizing conditions, with or without the addition of an accelerator, and vulcanizing the rubber. The invention more specifically comprises vulcanizing rubber with a substantially halide-free reaction product of a sulphur halide and an amine.

This application is a division of the co-pending application Serial No. 359,818, filed February 19, 1920, now issued as U. S. Patent 1,559,393, Oct. 27, 1925.

In carrying out the invention in its preferred form, 100 parts of rubber may be mixed with 2 parts of the reaction product of ammonia and sulphur chloride. This reaction product, known as nitrogen sulphide, appears to have the formula $N_4S_4$, which may be structurally expressed as

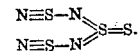

The mixture is placed in a mold and vulcanized under 40 lbs. steam pressure per square inch for approximately 10 minutes, whereupon vulcanization is complete. Excessive temperatures and long periods of vulcanization may cause over-vulcanization. The temperature required or the time, or both, may be modified by the inclusion of an accelerator such as an amine or an amine derivative.

As an example 100 parts of rubber mixed with 10 parts of zinc oxide, 2 parts of nitrogen sulphide and 0.1 part of dimethylammonium dimethyldithiocarbamate may be vulcanized in a mold at 40 lbs. steam pressure for 10 minutes. The sensitiveness of the stock to overvulcanization is materially decreased, for the stock may be allowed to remain in the mold for as much as 40 minutes or longer if desired without over-vulcanization.

The reaction product of sulphur chloride and ammonia mentioned above is preferably prepared as follows:

An excess of gaseous ammonia is run into a 5% (by weight) carbon tetrachloride solution of sulphur chloride. Ammonium chloride is precipitated and the compound, which is believed to be nitrogen sulphide is formed. The material is purified, removing sulphur and ammonium chloride.

The diethyl ester of thiosulphurous acid,

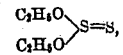

may be employed instead of the nitrogen sulphide above mentioned. The diethylester of thiosulphurous acid is formed by the addition of sodium alcoholate to sulphur chloride. The compound may be used in the proportions specified in the above examples.

The compounds mentioned above may be considered in general to be comprised under the general type $RS_2$ in which either nitrogen or oxygen may be attached to the sulphur. It is also probable that nitrogen and oxygen may be replaced by either sulphur or carbon, and other similar elements or groups. These compounds may be considered as derivatives of the hypothetical acid

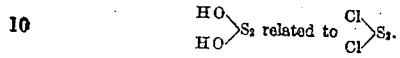

They may be prepared by replacing one or both of the chlorines of sulphur monochloride by various groups. This type of curing agent is characterized by the property of regenerating a cold curing agent, probably sulphur monochloride or the like, when treated with gaseous hydrogen chloride in benzol solvent. In carrying out this test, a small amount of the curing material is added to a rubber cement in a test tube, and gaseous hydrogen chloride is led in. Solidification of the mass indicates vulcanization, and hence that the material being tested is a member of the class herein described.

The reformation of a cold curing agent from the material is perhaps due to the assumed double bonded linking of sulphur $S=S$, which resembling as it does the assumed linking in sulphur chloride is adapted upon coming in contact with gaseous hydrochloric acid to regenerate the sulphur chloride, which serves as a cold curing agent.

The vulcanized material made in accordance with the process as indicated possesses the various advantages of stock cured in the ordinary manner with sulphur as such. It will be observed that the speed of cure is vastly superior to that found when ordinary sulphur is employed. Stocks produced in accordance with the process herein set forth have excellent physical qualities, and contain relatively small amounts of sulphur combined or otherwise, the combined sulphur being approximately ½% or less. The products have superior ageing properties and tensile strength, and are free from bloom.

Having thus described our invention, what we claim and desire to protect by Letters Patent is:

1. A process of treating rubber which comprises subjecting the rubber to the reaction product of ammonia and a sulphur halide, and vulcanizing the rubber.

2. A process of treating rubber which comprises subjecting the rubber to the reaction product of ammonia and a sulphur chloride, and vulcanizing the rubber.

3. A process of treating rubber which comprises subjecting rubber to nitrogen tetrasulphide, and vulcanizing the rubber.

4. A process of treating rubber which comprises subjecting the rubber to the reaction product of ammonia, a sulphur halide and an organic accelerator, and vulcanizing the rubber.

5. A process of treating rubber which comprises subjecting the rubber to the reaction product of ammonia, a sulphur chloride and an organic accelerator, and vulcanizing the rubber.

6. A process for treating rubber which comprises subjecting rubber to nitrogen tetrasulphide and an organic accelerator, and vulcanizing the rubber.

7. A process of treating rubber which comprises subjecting the rubber to the reaction product of ammonia, a sulphur halide and an amine accelerator, and vulcanizing the rubber.

8. A process of treating rubber which comprises subjecting the rubber to the reaction product of ammonia, a sulphur chloride and an amine accelerator, and vulcanizing the rubber.

9. A process for treating rubber which comprises subjecting the rubber to nitrogen tetrasulphide and an amine accelerator, and vulcanizing the rubber.

10. Rubber vulcanized with a substantially halide-free reaction product of a sulphur halide and ammonia.

11. Rubber vulcanized with a substantially halide-free reaction product of sulphur chloride and ammonia.

12. Rubber vulcanized with a nitrogen sulphide.

13. Rubber vulcanized with nitrogen tetrasulphide.

14. Rubber vulcanized with the reaction product of ammonia and a sulphur halide, and an accelerator.

15. Rubber vulcanized with the reaction product of ammonia and sulphur chloride, and an amine accelerator.

16. Rubber vulcanized with the reaction product of a nitrogen sulphide and an amine accelerator.

Signed at Ringoes, county of Hunterdon, State of New Jersey, this 14th day of Sept., 1925.

THEODORE WHITTELSEY.

Signed at Mishawaka, county of St. Joseph, State of Indiana, this 17th day of Sept., 1925.

CHARLES E. BRADLEY.